(12) United States Patent
Kimiabeigi

(10) Patent No.: US 8,593,028 B2
(45) Date of Patent: Nov. 26, 2013

(54) MAGNET FOR A GENERATOR

(75) Inventor: Mohammad Kimiabeigi, Sheffield (GB)

(73) Assignee: Siemens Aktiengesellschaft, München (DE)

( * ) Notice: Subject to any disclaimer, the term of this patent is extended or adjusted under 35 U.S.C. 154(b) by 193 days.

(21) Appl. No.: 13/299,411

(22) Filed: Nov. 18, 2011

(65) Prior Publication Data

US 2012/0133232 A1  May 31, 2012

(30) Foreign Application Priority Data

Nov. 26, 2010  (EP) ...................................... 10192739

(51) Int. Cl.
*H02K 21/12* (2006.01)

(52) U.S. Cl.
USPC ....................................... 310/156.47

(58) Field of Classification Search
USPC ............ 310/156.47, 156.07, 156.08, 156.09, 310/156.49
See application file for complete search history.

(56) References Cited

U.S. PATENT DOCUMENTS

| | | | |
|---|---|---|---|
| 3,768,054 A | 10/1973 | Neugebauer | |
| 4,764,743 A | 8/1988 | Leupold | |
| 6,445,105 B1 * | 9/2002 | Kliman et al. | 310/268 |
| 2011/0175480 A1 * | 7/2011 | Booth et al. | 310/156.13 |

FOREIGN PATENT DOCUMENTS

| | | |
|---|---|---|
| JP | 62 140876 A | 6/1987 |
| JP | 63 120568 A | 5/1988 |
| JP | 2009 213283 A | 9/2009 |

* cited by examiner

*Primary Examiner* — Nguyen N Hanh

(57) ABSTRACT

A magnet for a generator is provided. The magnet includes a base magnet with a main surface having a length and a width and a skewed magnet module arranged at the main surface. A rotor of a generator including the magnet is provided as well as a generator with a stator and rotor including the magnet.

20 Claims, 4 Drawing Sheets

FIG 1 - Prior Art

MAGNET FOR A GENERATOR

CROSS REFERENCE TO RELATED APPLICATIONS

This application claims priority of European Patent Office application No. 10192739.0 EP filed Nov. 26, 2010, which is incorporated by reference herein in its entirety.

FIELD OF INVENTION

The present invention relates in general to a magnet for a generator. In particular, the present invention is directed to a magnet for a generator, a rotor, a stator and a generator comprising the magnet.

BACKGROUND OF INVENTION

Due to variation in magnetic forces within rotating permanent magnet machines like generators or motors pulsations of torque occur. The torque pulsations occur at no-load and load situations, hereafter denoted cogging torque and ripple torque. These torque pulsations may lead to vibrations which can be harmful to the rotating machine and interconnected parts. Furthermore, the torque pulsations can create acoustic noise of low frequency which can disturb the environment. This problem can be even more pronounced in direct drive wind generators.

Reduction of torque can be achieved with different methods like optimizing the 2-dimensional shape of the magnet, shaping the stator/rotor tooth tips, displacing the magnets, conventional skew of the magnets or active damping via injection of current harmonics. Each method has its own drawbacks e.g. by magnet displacement, the magnet leakage flux is increased and thereby the output torque is reduced. Conventional magnet shaping in 2-dimension increases cost of manufacturing compared to conventional skew and needs accurate modelling tools like numerical FEM for optimizing the shape of the magnet.

Skew of the magnets is simple and inexpensive in general. However, conventional skew has several drawbacks like the distribution of magnet flux and thereby reduction of the magnet flux fundamental component and thereby reduction of the output average torque of the generator. Furthermore, for simplicity reasons of the magnet shape and fitting the magnet on a curved surface of the rotor, the skew is usually done in finite and few numbers of steps. As a result, more magnet flux leaks in the regions where two blocks are distant from one another, which is depicted by flux leakage vectors in FIG. 1. Consequently, more volume of magnets is required to provide the same average torque (i.e. magnets are not used efficiently).

Furthermore, since skewing in many steps may correlate with higher flux leakage, the skew is normally done in few numbers of steps and thereby the ripple or cogging torque minimization may not be fully effective for some designs.

SUMMARY OF INVENTION

It is therefore an object of the present invention to reduce torque pulsations in permanent magnet machines.

This object is solved by the features of the claims. The dependent claims offer further details and advantages of the invention.

In one aspect the invention is directed to a magnet for a generator, comprising a base magnet with a main surface having a length and a width and a skewed magnet module arranged at the main surface. The cogging and ripple torque, thereby vibration and mechanical fatigue, in the generator are minimized using this novel skewing technique. The proposed magnet is more effective than existing alternatives e.g. conventional skew in the manner of cogging and ripple torque minimization while it does not have the drawbacks of the latter like reduction of average torque and thereby the output power. Unlike the conventional skew in which the whole magnet pole is skewed, it is proposed to introduce an asymmetrical magnet shape e.g. by adding an extra magnet on a surface of the base magnet and only skew this skewed magnet module.

The analytical and FE calculation has proved that the novel magnet does minimize the ripple and cogging torque effectively. Furthermore, it does not have the drawbacks of the conventional skew. In the new technique, there is no extra leakage flux due to skewing, simply because the base magnet has not been displaced, so the flux of the skewed module has to follow the same magnetization pattern of the dominating base magnet. Another advantage of the proposed magnet is that the skewed magnet module makes it easier to have a continuous skew or since there is no extra flux leakage, it is possible to do the skew in any number of steps and thereby minimizing the ripple torque more effectively.

The proposed magnet is very simple in implementation and thereby results in a cheaper product like a direct drive generator or a rotor or stator of it with improved performance.

Finally, since the proposed skew reduces the magnet flux harmonics in the air gap of the generator, it is also an effective technique to minimize the loss in the generator and improve the efficiency.

The base magnet may have a rectangular shape. This shape is easy to manufacture and to assemble.

The base magnet and the skewed magnet module may be integrally formed. It is also possible that the base magnet and the skewed magnet module can be composed of several pieces and put together in axial direction, or the base magnet can be separate from the skewed magnet module and they can be fit together by using a fitting cover or glue.

The skewed magnet module may comprise several magnet segments arranged along the length of the magnet and the magnet segments may comprise an offset in width direction. This arrangement is adapted to the standard configuration of a permanent magnet machine and can therefore be widely used.

The width of the base magnet may equal substantially to two times the tooth pitch of the generator and the width of a magnet segment may equal substantially to the tooth pitch of the generator. The presence of the skewed magnet module allows a continuously width of the base magnet of around two times the tooth pitch. The segments may be skewed by the span of one tooth pitch. The non-skewed volume disappears which increases the effectiveness of the skewing by a great margin.

The width of the base magnet may equal substantially to two times and two thirds the tooth pitch of the generator, two skewed magnet modules may be arranged at the main surface, the width of a magnet segment of one skewed magnet module may equal substantially to the tooth pitch of the generator and the width of a magnet segment of the other skewed magnet module may equal substantially to one third the tooth pitch of the generator. This solution keeps the advantages described above while allowing a finer adaptation to the permanent magnet machine.

The skewed magnet module may comprise a recess in the main surface, wherein the recess may be arranged at an angle with respect to the length of the main surface. An alternative approach to fulfil the same advantages as previously described is to create a skewed-like trail of recess or cavity in the base magnet. The manufacturing cost will be less. The technique may be implemented by simple form of machining and trimming the specified skew-like corridor away from the rectangular base magnet.

The skewed magnet module may face teeth of the generator. This arrangement improves the reduction of magnet flux harmonics in the air gap which is an effective technique to minimize the loss in the generator and improve the efficiency.

The thickness of the skewed magnet module may be less than or equal to half of the thickness of the base magnet. Due to the fact that only a small fraction of the magnet flux is distributed (i.e. the fundamental flux is almost the same as the case with no skew due to the fact that the skewed part is much thinner than the dominant base magnet), the reduction of the fundamental component of the magnet flux is almost negligible, so is the reduction of average torque.

The skewed magnet module may extend over the complete length of the magnet, the skewed magnet module may comprise several magnet segments and each magnet segment may have the same length. This uses the available space for skewing resulting in higher effectiveness of the skewing.

In a second aspect the invention is directed to a rotor of a generator comprising a magnet as described above. The same advantages and modifications as described above apply here. This rotor is suitable for a permanent magnetic machine having the windings in a stator.

In a third aspect the invention is directed to a stator of a generator comprising a magnet as described above. The same advantages and modifications as described above apply here. This rotor is suitable for a permanent magnetic machine having the windings in a rotor.

In a further aspect the invention is directed to a generator with a stator and a rotor, comprising a magnet as described above. The same advantages and modifications as described above apply here.

The generator may comprise an outer rotor configuration for a wind turbine. The proposed magnet is very suitable for the large direct drive generators like in wind power application. It effectively serves to reduce noise, increases reliability, increases efficiency or reduces the weight of the generator for the same efficiency.

BRIEF DESCRIPTION OF THE DRAWINGS

The accompanying drawings are included to provide a further understanding of embodiments. Other embodiments and many of the intended advantages will be readily appreciated as they become better understood by reference to the following detailed description. The elements of the drawings do not necessarily scale to each other. Like reference numbers designate corresponding similar parts.

DETAILED DESCRIPTION OF INVENTION

In the following detailed description, reference is made to the accompanying drawings which form a part hereof and in which are shown by way of illustration specific embodiments in which the invention may be practised. In this regard, directional terminology, such as "top" or "bottom" etc. is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
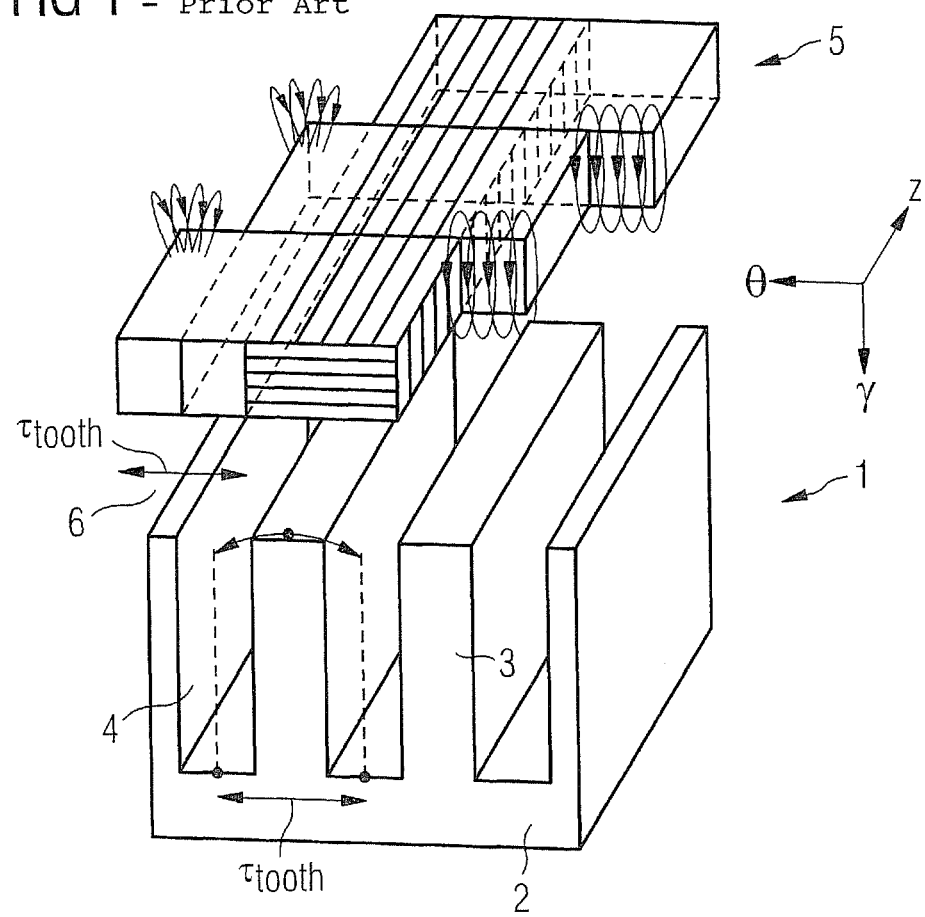
FIG. 1 illustrates a schematic view of a magnet and teeth of a known permanent magnet machine.
Figure 2:
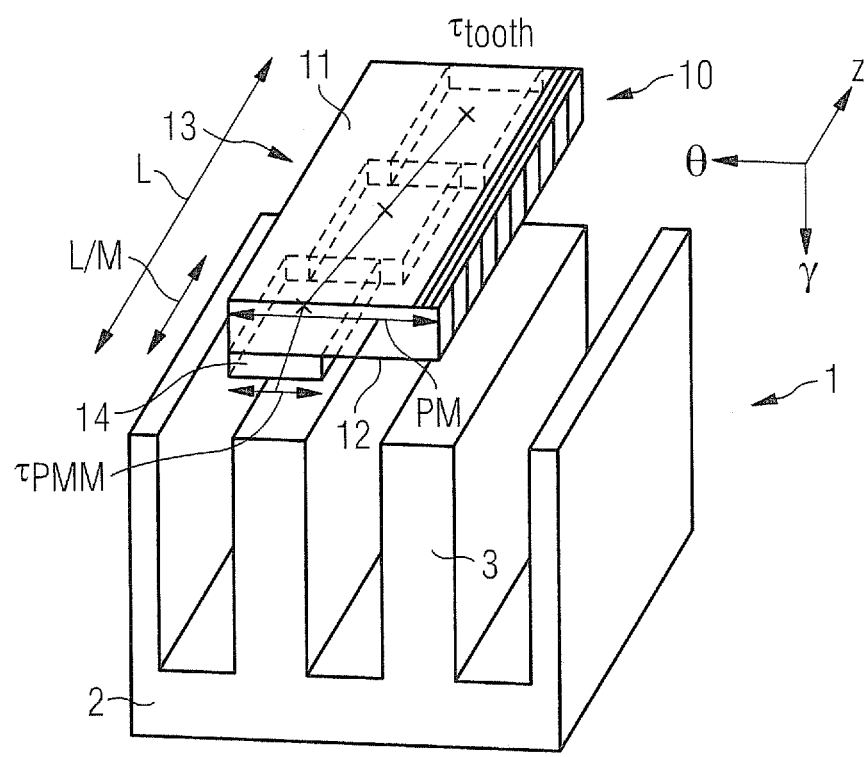
FIG. 2 illustrates a schematic cross-sectional view of a magnet and teeth of a permanent magnet machine according to the invention.
Figure 3:
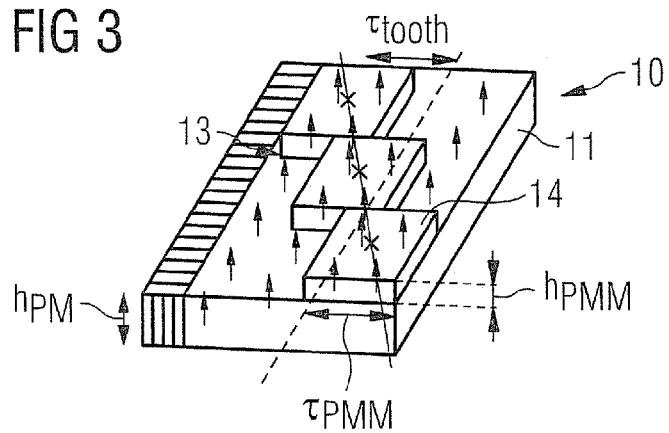
FIG. 3 illustrates a schematic bottom view of the magnet together with the magnetic field according to the invention.
Figure 4:
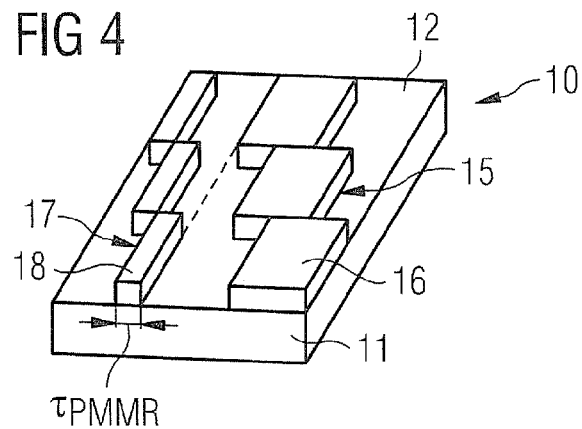
FIG. 4 illustrates a schematic bottom view of another magnet according to the invention.

FIG. 1 shows part of a known permanent magnet machine for example a generator 1. With the known generator 1 the basic structure and function of the generator 1 is explained in preparation for the proposed magnet and permanent magnet machine as shown in FIGS. 2 to 4.

The generator 1 has a stator 2 with teeth 3. The teeth 3 are arranged with a distance called tooth pitch $\tau_{tooth}$ to each other. Between two teeth 3 a groove 4 for accommodating windings is arranged. The tooth pitch $\tau_{tooth}$ shown reaches from the middle of a groove 4 to the middle of a neighbouring groove 4 as this indicates a vibration domain.

A magnet 5 which is attached to a rotor (not shown) of the generator 1 is located above the teeth 3. Above means in radial direction r. Between the magnet 5 and the teeth 3 is an air gap 6 of the generator 1.

In an alternative design the teeth can be part of the rotor while the magnet can be arranged at the stator.

The conventional magnet 5 is skewed in two steps which results in three modules or parts of the magnet 5. The modules are skewed by a margin of half the tooth pitch $\tau_{tooth}$. Note that the skew could also be done with a spatial span of one tooth pitch.

The hatching illustrates the un-skewed volume of the skewed magnet modules. The skewing pitch, i.e. the tooth pitch $\tau_{tooth}$, is often smaller, about half of the magnet width. From tooth perspective, this region is not skewed and this is one of the reasons why the effectiveness of conventional skew is usually not 100%.

Further, the additional leakage flux leaving the modules is shown at those parts of a front surface (in direction z) which are not covered by a neighbouring module. The flux leakages reduce the average torque of the Generator 1 and are therefore not desired.

FIG. 2 shows a permanent magnetic machine like a motor or generator 1 according to the invention. The structure shown is the same as the one of FIG. 1 despite the magnet. The explanation above (except for the magnet) holds true for FIG. 2.

The magnet 10 has a base magnet 11 with a width $w_{PM}$ of two times the tooth pitch $\tau_{tooth}$. The width $w_{PM}$ can be exactly two times the tooth pitch $\tau_{tooth}$ or it can be close to it, e.g. +/−10%. The width $w_{PM}$ extends in a circumferential direction θ. The base magnet 11 has a length L in the direction of z. The width $w_{PM}$ and the length L span a main surface 12.

Actually, the base magnet 11 has two main surfaces, one facing the stator 2 and its teeth 3 and another one being opposite. Later on, the term main surface refers to the first one.

At the main surface 12 a skewed magnet module 13 is arranged. The skewed magnet module 13 comprises three magnet segments 14 which can be identical. Each magnet segment 14 has a width $w_{PMM}$ of one time the tooth pitch $\tau_{tooth}$. The width $w_{PMM}$ can be exactly one time the tooth pitch $\tau_{tooth}$ or it can be close to it, e.g. +/−10%. The length of each magnet segment 14 equals to L/m wherein m is the number of magnet segments 14. In this case, the length of a magnet segment 14 amounts to a third of the length L of the base magnet 11. The three magnet segments 14 are arranged in the direction of the length L of the base magnet 11.

The magnet segments 14 comprise an offset or skew in direction of the width $w_{PM}$ of the base magnet 11 or the width $w_{PMM}$ of the magnet segment 14 which is in this case the same direction. The offset is one third of the tooth pitch $\tau_{tooth}$ and the offset of the first and the last magnet segment 14 amounts to the tooth pitch $\tau_{tooth}$.

The hatching illustrates the un-skewed volume of base magnet 11. The width of the un-skewed volume is only one third of the tooth pitch $\tau_{tooth}$.

FIG. 3 shows the magnet 10 from the bottom side. The base magnet 11 has a height $h_{PM}$ in radial direction r while the magnet segment 14 has a height $h_{PMM}$. The height $h_{PMM}$ of the magnet segment 14 is smaller than the height $h_{PM}$ of the base magnet 11. The height $h_{PMM}$ of the magnet segment 14 can be half, a third or even smaller than height $h_{PM}$ of the base magnet 11.

Further, FIG. 3 shows the magnetic field indicated by the arrows running in radial direction. There is no extra leakage flux due to skewing because the base magnet 11 has not been displaced. So the flux of the skewed magnet module 13 has to follow the same magnetization pattern of the dominating base magnet 11.

FIG. 4 shows another magnet 10 with a base magnet 11 as shown in FIG. 3 and described in conjunction with FIG. 3. Here, two skewed magnet modules are attached to the main surface 12 of the main magnet 11. A first skewed magnet module 15 has three magnet segments 16 which are skewed. The magnet segment 16 has a width of one tooth pitch $\tau_{tooth}$ and are set off by the width of the magnet segment 16. A second skewed magnet module 17 has three magnet segments 18 which are skewed. The magnet segment 18 has a width $w_{PMM2}$ of one third of the tooth pitch $\tau_{tooth}$ and are set off by one third of the width of the magnet segment 18.

The two skewed magnet modules 15, 17 are arranged such that at the main surface 12 that in width direction every part of the base magnet 11 is covered by at least one magnet segment 16 or 18. Because of this arrangement there is no un-skewed volume of base magnet 11.

Fabrication of the magnet 10 is easy as only rectangular shapes need to be produced an fit together e.g. by means of glue.

Figure 5:
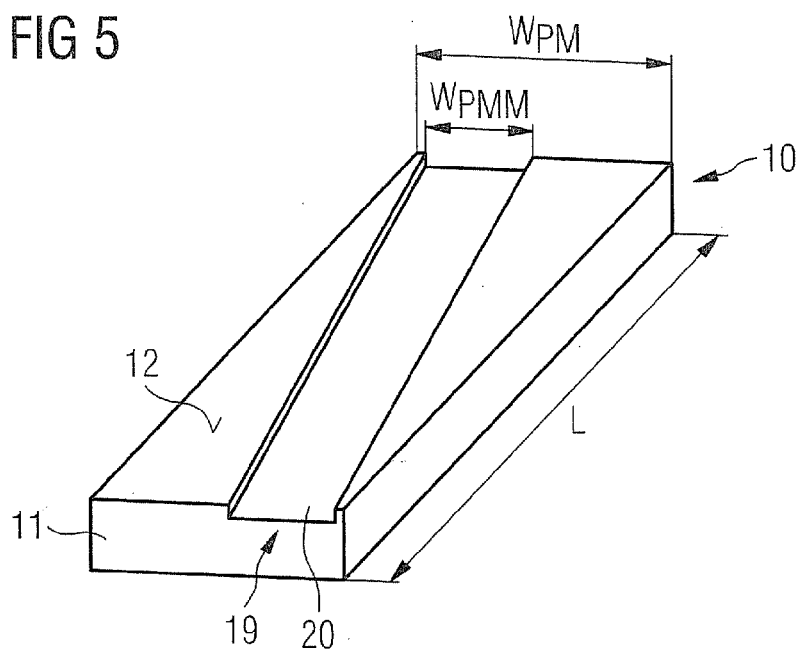
FIG. 5 illustrates a schematic bottom view of another magnet according to the invention.

FIG. 5 shows a further magnet 10 with a base magnet 11 similar to the ones described in conjunction with FIGS. 2 to 4. Here, the skewed magnet module 19 is realised by a recess or cavity 20. The recess 20 is arranged in a diagonal manner in the main surface 12. The angle between the length L of the main surface 12 and the recess 20 can be the same under which the magnet segments 14 of FIG. 2 are arranged. It is also possible to arrange the recess 20 in such a manner that it stretches diagonally from one side of the main surface 12 or the base magnet 11 to the other side.

With respect to the dimensions of the recess 20 like the width $w_{PMM}$ or the height the same dimensioning rules apply as for FIGS. 2 to 4.

Figure 6:
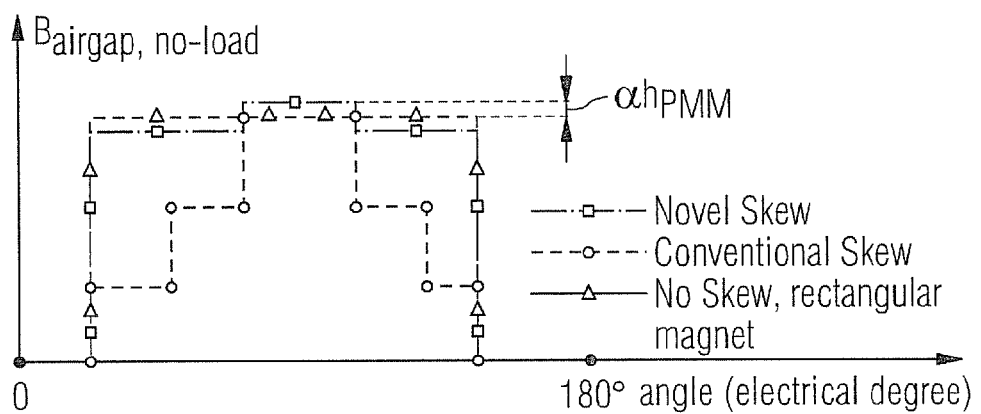
FIG. 6 shows a diagram of the magnetic flux density in the air gap.

FIG. 6 shows the magnet flux density in the air gap 6. The curve for conventional skew shows large increases in the density leading to reduced torque. The skew according to the invention reduces the flux density only by a small margin as shown by the respective curve.

Figure 7:
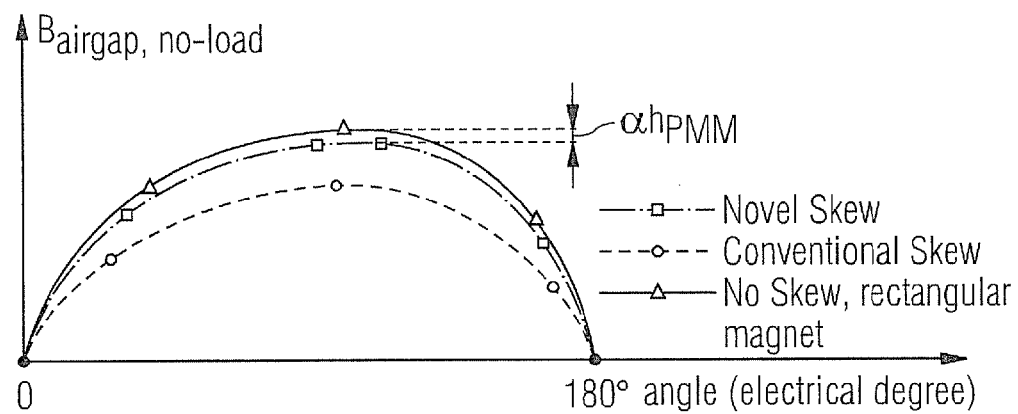
FIG. 7 shows a diagram of the fundamental component of the magnetic flux density of FIG. 6.

FIG. 7 shows the fundamental component of the magnet flux. The situation is the same as in FIG. 6, the skew according to the invention reduces the fundamental component only by a small margin.

Due to the fact that only a small fraction of the magnet flux is distributed the reduction of the fundamental component of the magnet flux is almost negligible, so is the reduction of average torque.

With the inventive skew it is possible to do the skew in any number of steps which minimizes the ripples more effectively.

I claim:
1. A magnet for a generator, comprising:
a base magnet with a main surface having a length and a first width; and
a skewed magnet module arranged at the main surface.
2. The magnet according to claim 1, wherein the base magnet includes a rectangular shape.
3. The magnet according to claim 1, wherein the base magnet and the skewed magnet module are integrally formed.
4. The magnet according to claim 1,
wherein the skewed magnet module comprises a plurality of magnet segments arranged along the length of the base magnet, and
wherein the plurality of magnet segments comprise an offset in width direction.
5. The magnet according to claim 1,
wherein the first width of the base magnet equals substantially to two times a tooth pitch of the generator, and
wherein a second width of a first magnet segment equals substantially to the tooth pitch of the generator.
6. The magnet according to claim 1,
wherein the first width of the base magnet equals substantially to two times and two thirds a tooth pitch of the generator,
wherein two skewed magnet modules are arranged at the main surface,
wherein a second width of a first magnet segment of one skewed magnet module equals substantially to the tooth pitch of the generator, and
wherein a third width of a second magnet segment of the other skewed magnet module equals substantially to one third the tooth pitch of the generator.
7. The magnet according to claim 1,
wherein the skewed magnet module comprises a recess in the main surface, and
wherein the recess is arranged at an angle with respect to the length of the main surface.
8. The magnet according to claim 7,
wherein the first width of the base magnet equals substantially to two times a tooth pitch of the generator, and
wherein a fourth width of the recess equals substantially to the tooth pitch of the generator.
9. The magnet according to claim 1, wherein the skewed magnet module faces teeth of the generator.
10. The magnet according to claim 1, wherein a first thickness of the skewed magnet module is less than or equal to half of a second thickness of the base magnet.

11. The magnet according to claim 1,
wherein the skewed magnet module extends over the complete length of the magnet,
wherein the skewed magnet module comprises a plurality of magnet segments, and
wherein each magnet segment has the same length.

12. The rotor of a generator, comprising:
a magnet according to claim 1.

13. A generator with a stator and a rotor, comprising:
a magnet according to claim 1.

14. The generator according to claim 13, wherein the generator further comprises an outer rotor configuration for a wind turbine.

15. The generator according to claim 13, wherein the base magnet includes a rectangular shape.

16. The generator according to claim 13, wherein the base magnet and the skewed magnet module are integrally formed.

17. The generator according to claim 13,
wherein the skewed magnet module comprises a plurality of magnet segments arranged along the length of the base magnet, and
wherein the plurality of magnet segments comprise an offset in width direction.

18. The generator according to claim 13,
wherein the first width of the base magnet equals substantially to two times a tooth pitch of the generator, and
wherein a second width of a first magnet segment equals substantially to the tooth pitch of the generator.

19. The generator according to claim 13,
wherein the first width of the base magnet equals substantially to two times and two thirds a tooth pitch of the generator,
wherein two skewed magnet modules are arranged at the main surface,
wherein a second width of a first magnet segment of one skewed magnet module equals substantially to the tooth pitch of the generator, and
wherein a third width of a second magnet segment of the other skewed magnet module equals substantially to one third the tooth pitch of the generator.

20. The generator according to claim 13,
wherein the skewed magnet module comprises a recess in the main surface, and
wherein the recess is arranged at an angle with respect to the length of the main surface.

* * * * *